(12) United States Patent
Homma et al.

(10) Patent No.: US 9,004,781 B2
(45) Date of Patent: Apr. 14, 2015

(54) METHOD FOR REINFORCING A SPLICE PART AND REINFORCING STRUCTURE

(75) Inventors: Toshihiko Homma, Yokohama (JP); Kensuke Ito, Yokohama (JP); Masahiro Hasegawa, Yokohama (JP); Masayoshi Kagami, Sendai (JP); Sayuri Kagami, legal representative, Sendai (JP); Naoto Tanaka, Tokyo (JP)

(73) Assignees: Sumitomo Electric Industries, Ltd., Osaka-shi, Osaka (JP); Nippon Telegraph and Telephone East Corporation, Shinjuku-ku, Tokyo (JP)

( * ) Notice: Subject to any disclaimer, the term of this patent is extended or adjusted under 35 U.S.C. 154(b) by 137 days.

(21) Appl. No.: 13/255,359

(22) PCT Filed: Mar. 10, 2010

(86) PCT No.: PCT/JP2010/054052
§ 371 (c)(1),
(2), (4) Date: Feb. 16, 2012

(87) PCT Pub. No.: WO2010/104132
PCT Pub. Date: Sep. 16, 2010

(65) Prior Publication Data
US 2012/0170899 A1     Jul. 5, 2012

(30) Foreign Application Priority Data

Mar. 11, 2009   (JP) ................................ 2009-058617

(51) Int. Cl.
     *G02B 6/255*      (2006.01)

(52) U.S. Cl.
     CPC .................... *G02B 6/2558* (2013.01)

(58) Field of Classification Search
     USPC ........................................................... 385/99
     See application file for complete search history.

(56) References Cited

U.S. PATENT DOCUMENTS

| 4,509,820 | A | * | 4/1985 | Murata et al. | 385/99 |
| 6,481,903 | B1 | * | 11/2002 | Varma et al. | 385/99 |
| 7,494,289 | B1 | * | 2/2009 | Chen | 385/99 |

FOREIGN PATENT DOCUMENTS

| JP | 59-216112 | 12/1984 |
| JP | 1-153504 | 10/1989 |
| JP | 3-77903 | 8/1991 |
| JP | 2004-38019 | 2/2004 |
| JP | 2008-65170 | 3/2008 |

* cited by examiner

*Primary Examiner* — Kaveh Kianni
(74) *Attorney, Agent, or Firm* — Drinker Biddle & Reath LLP

(57) ABSTRACT

A method and structure for reinforcing a fusion splice part where optical fiber cores extending from sheaths of a pair of optical cables are spliced to each other, wherein a reinforcing member is provided along the fusion splice part so that both ends of the reinforcing member overlap with each of the sheaths of the optical cables; an adhesive tube covers the periphery of the fusion splice part provided with the reinforcing member so that both ends of the adhesive tube overlap with each of the sheaths of the optical cables, and is contracted; and a protective tube covers the periphery of the adhesive tube so that both ends of the protective tube overlap with each of the sheaths of the optical cables, the adhesive tube is outwardly projected in the length direction, and is contracted.

12 Claims, 13 Drawing Sheets

METHOD FOR REINFORCING A SPLICE PART AND REINFORCING STRUCTURE

TECHNICAL FIELD

The present invention relates to a method for reinforcing a splice part where optical fiber cores are spliced to each other and a reinforcing structure.

BACKGROUND TECHNOLOGY

With respect to a technology for reinforcing a splice part where optical fiber cores are spliced to each other, in particular, a reinforcing member of an optical fiber fusion splice part, which contains a reinforcing rod and a heat melting tube in a heat contractive tube, containing and holding the reinforcing rod and the heat melting tube through elasticity of the heat contractive tube prior to heat contraction has been known (refer to Patent Document 1, for instance).

In addition, a fusion splice part housing member having the structure wherein a fusion splice part holding member capable of fixing optical drop cables and a fusion splice part of optical fibers led in the front ends of the optical fiber drop cables is contained in a protecting member, and the fusion splice part holding member have been known (refer to Patent Document 2, for instance).

RELATED ART

Patent Documents

Patent Document 1: Japanese Patent Application Publication No. 2004-38019
Patent Document 2: Japanese Patent Application Publication No. 2008-65170

SUMMARY OF THE INVENTION

Problems to be Solved by the Invention

However, an optical fiber core is easily affected by a tensile force. Accordingly, simply providing a reinforcing rod or the like along the fusion splice part and covering the optical fiber core part with a heat contractive tube or the like for reinforcement does not assure sufficient strength of the reinforced part against the tensile force. Thus, a problem may occur in the fusion splice part of the optical fiber cores.

For example, in FTTH (Fiber To The Home) or the like, optical fibers are led from optical fiber codes of an optical communication network to an optical communication subscriber's house via optical drop cables through a relaying machine such as a closure. However, if any problem occurs in the fusion splice part of the optical fiber cores at the ends of the optical drop cables, all the optical drop cables should be led in again, thereby resulting in waste of the optical drop cables and unnecessary lead-in works.

The object of the present invention is to provide a method for reinforcing a splice part and a reinforcing structure, which enable reinforcement of a splice part of optical fiber cores with sufficient strength.

Means to Solve the Problems

A method for reinforcing a splice part according to the present invention to solve the above problems relates to a method for reinforcing a splice part of optical fiber cores extending from sheaths of a pair of optical cables, the method is characterized by including:

providing a reinforcing member along the splice part so that both ends of the reinforcing member overlap with each of the sheaths of the optical cables, covering a periphery of the splice part provided with the reinforcing member by an inner tube so that both ends of the inner tube overlap with each of the sheaths of the optical cables, and contracting the inner tube, and covering a periphery of the inner tube by an outer tube so that both ends of the outer tube overlap with each of the sheaths of the optical cables, and that the inner tube is outwardly projected in a length direction, and contracting the outer tube.

In the method for reinforcing a splice part according to the present invention, lengths of parts of the inner tube and the outer tube overlapping with the sheaths of the optical cables in the length direction is preferably at least 7 mm.

In the method for reinforcing a splice part according to the present invention, it is preferable that, in the reinforcing member, a sheath disposition area where the sheath part is disposed is lower than a core disposition area where the optical fiber core part is disposed.

In the method for reinforcing a splice part according to the present invention, it is preferable that a groove part for containing the sheaths is formed in a sheath disposition area where the sheath part is disposed, in the reinforcing member.

In the method for reinforcing a splice part according to the present invention, the groove part of the reinforcing member is preferably in a cross-section shape corresponding to a contour of the sheaths of the optical cables.

In the method for reinforcing a splice part according to the present invention, a periphery of the outer tube of the splice part is preferably covered with a weather resistance tube.

A structure for reinforcing a splice part according to the present invention relates to a structure for reinforcing a splice part where optical fiber cores extending from sheaths of a pair of optical cables are spliced to each other, including a reinforcing member provided along the splice part so that both ends of the reinforcing member overlap with each of the sheaths of the optical cables;

an inner tube covering a periphery of the splice part provided with the reinforcing member so that both ends of the inner tube overlap with each of the sheaths of the optical cables, the inner tube being contracted; and an outer tube covering a periphery of the inner tube so that both ends of the outer tube overlap with each of the sheaths of the optical cables, and that the inner tube is outwardly projected in a length direction, and being contracted.

In the structure for reinforcing a splice part according to the present invention, lengths of parts of the inner tube and the outer tube overlapping with the sheaths of the optical cables in the length direction is preferably at least 7 mm.

In the structure for reinforcing a splice part according to the present invention, it is preferable that, in the reinforcing member, a sheath disposition area where the sheath part is disposed is lower than a core disposition area where the optical fiber core part is disposed.

In the structure for reinforcing a splice part according to the present invention, it is preferable that a groove part for containing the sheaths is formed in a sheath disposition area where the sheath part is disposed, in the reinforcing member.

In the structure for reinforcing a splice part according to the present invention, the groove part of the reinforcing member is preferably in a cross-section shape corresponding to a contour of the sheaths of the optical cables.

In the structure for reinforcing a splice part according to the present invention, a periphery of the outer tube of the splice part is preferably covered with a weather resistance tube.

Effect of the Invention

According to the method for reinforcing a splice part and the reinforcing structure in the present invention, the reinforcing member is provided along the splice part of the optical fiber cores, and the inner tube and the outer tube cover the periphery of the reinforcing member, so that the splice part can be surely reinforced.

Especially, the reinforcing member is provided such that both ends of the reinforcing member overlap with the sheaths of the optical cables. And the inner tube and the outer tube cover the reinforcing member such that both ends of each of the tubes overlap with the sheaths of the optical cables, and are contracted. Accordingly, the reinforced part of the optical fiber core part including the splice part and the sheath parts of both sides thereof are integrated thereby enhancing the reinforcement. Accordingly, sufficient strength against the tensile force can be assured.

Since the inner tube is outwardly projected in the length direction of the outer tube, an adhesion force of both ends of the inner tube to the sheaths can increase thereby increasing the reinforcement strength.

MODE FOR CARRYING OUT THE INVENTION

Hereinafter, an embodiment of the method for reinforcing an optical fiber splice part and the reinforcing structure according to the present invention will be described with reference to the accompanying drawings.

Figure 1:
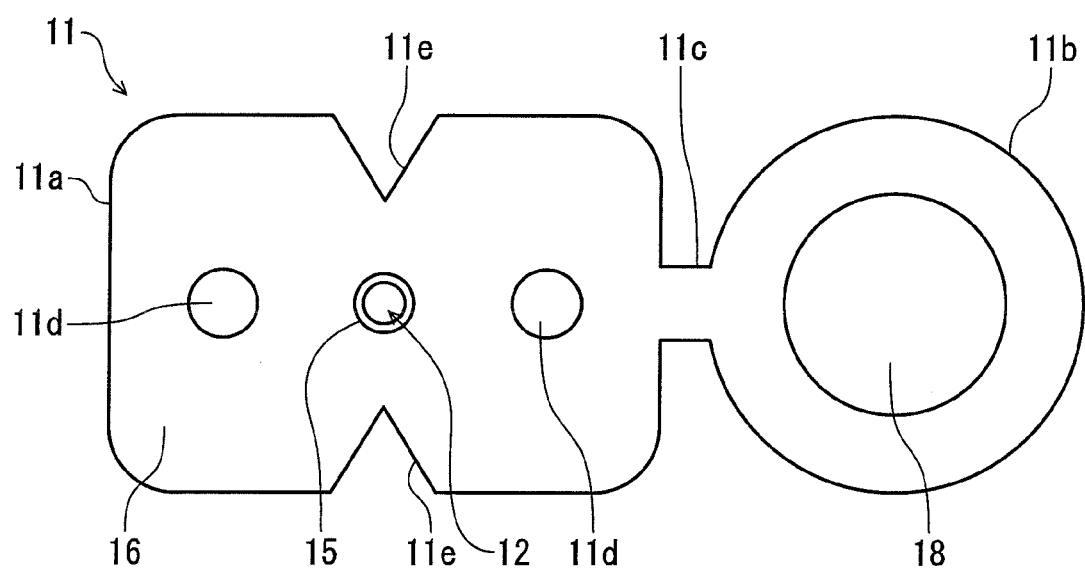
FIG. 1 is a cross-sectional view of an optical cable formed of an optical drop cable, to which the method for reinforcing a splice part and the reinforcing structure according to an embodiment of the present invention is applied.
Figure 2:
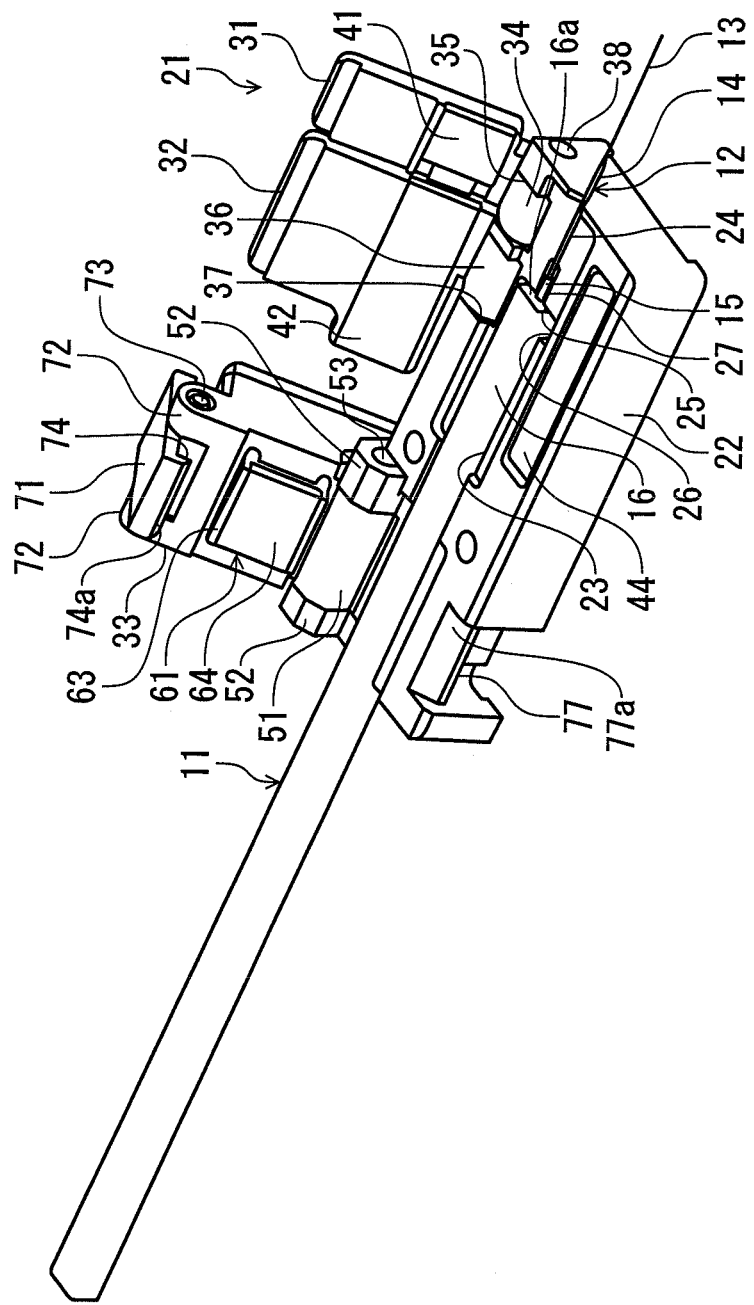
FIG. 2 is a perspective view of a holder used for splicing optical fiber cores to each other.
Figure 3:
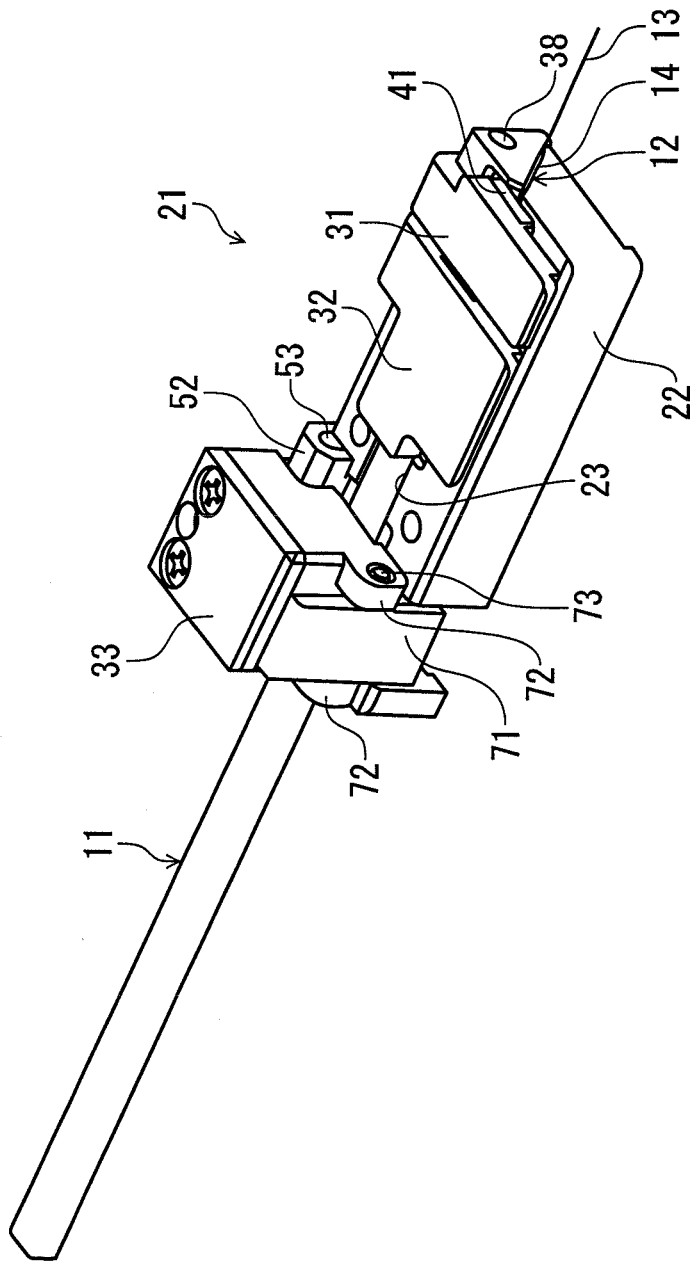
FIG. 3 is a perspective view of the holder in a state that each lid is closed.
Figure 4:
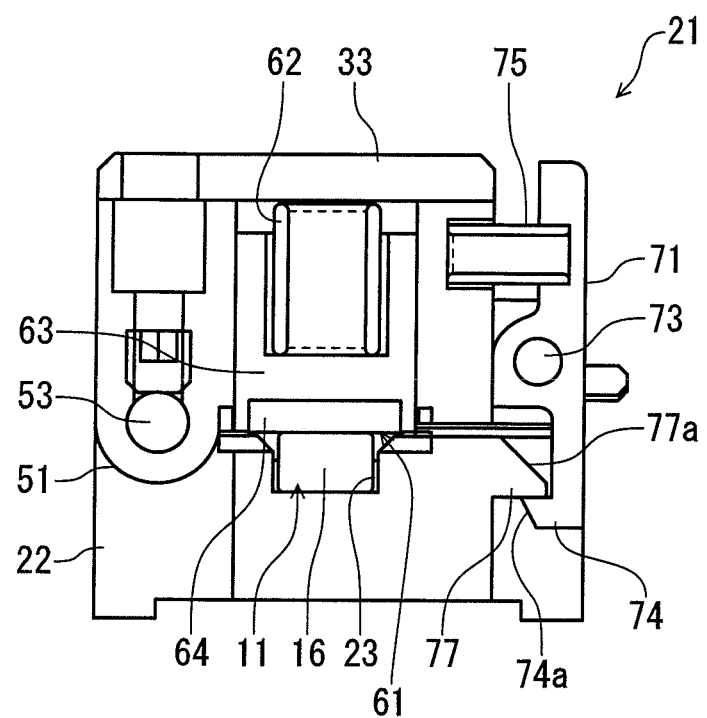
FIG. 4 is a cross-sectional view of the holder at a sheath holding lid part.
Figure 5:
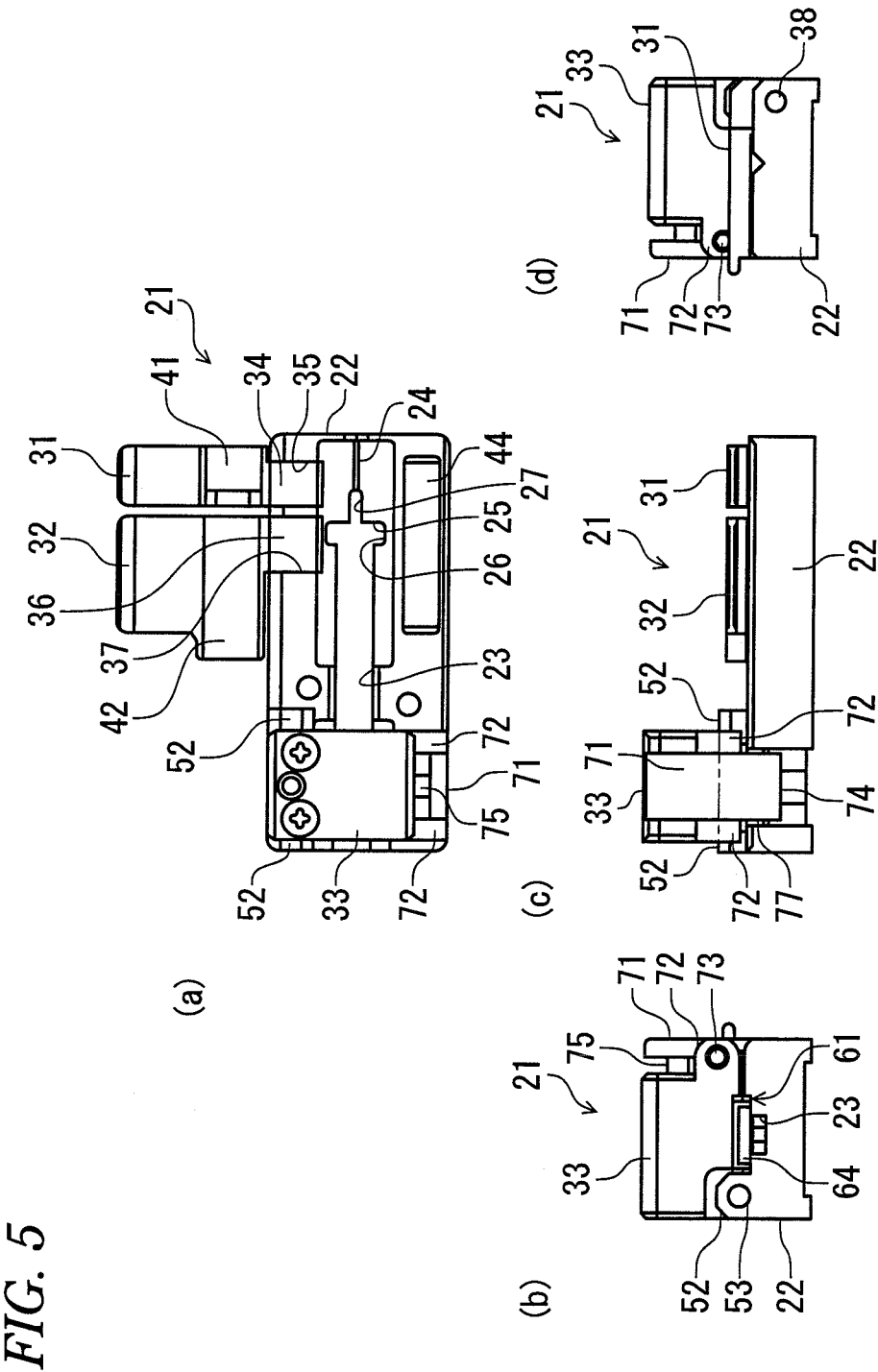
FIG. 5 is a view for explanation of configuration of the holder, in which (a) is a plane view, (b) is a side view when viewed at one end side, (c) is a front view, and (d) is a side view when viewed at the other end side.

FIG. 1 is a cross-sectional view of an optical cable formed of an optical drop cable, to which the method for reinforcing a splice part and the reinforcing structure according to the present embodiment are applied. FIG. 2 is a perspective view of a holder used for splicing optical fiber cores to each other. FIG. 3 is a perspective view of a holder in a state that each lid is closed. FIG. 4 is a cross-sectional view of a holder at a sheath holding lid part. FIG. 5 is a view for explanation of configuration of a holder, in which (a) is a plane view, (b) is a side view when viewed at one end side, (c) is a front view, and (d) is a side view when viewed at the other end side.

As an example of optical cables, to which the reinforcing method and the reinforcing structure of the present embodiment are applied, optical drop cables will be described.

As illustrated in FIG. 1, an optical cable 11 formed of an optical drop cable includes an optical fiber core 12 covered with a protective jacket 15, and a cross-section rectangular cable part 11a formed by embedding anti-tensile members 11d longitudinally provided at both sides of the optical core 12 in a sheath 16 made of a synthetic resin to collectively cover the anti-tensile members. A supporting line part 11b having a metal line 18 is longitudinally formed on the cable part 11a.

The cable part 11a and the supporting line part 11b are connected by a thin part 11c. The thin part 11c is torn and cut, whereby the cable part 11a can be separated from the supporting line part 11b. The optical fiber core 12 is embedded in the center of the cross section of the cable part 11a. The anti-tensile members 11b are embedded at both sides of the optical core 12. Notches 11e are formed on one and the other surfaces of the cable part 11a. The cable part 11a is torn by means of the notches 11e, whereby the optical fiber core 12 can be exposed.

A holder 21 of the present embodiment holds the optical cable 11 only having the cable part 11a separated from the supporting line part 11b by cutting the thin part 11c.

Next, the holder (optical fiber holder) 21 used for fusion splicing the optical fiber cores 12 to each other will be described with reference to FIGS. 2 to 5.

The end part of the optical cable 11 held by the holder 21 is led, so that the optical fiber core 12 is exposed from the end part of the optical cable 11. The optical fiber core 12 is formed by covering a glass fiber 13 with a sheath 14. The sheath 14 is removed by terminal processing, so that the glass fiber 13 is exposed. The protective jacket 15 covering the optical fiber core 12 is slightly exposed from the sheath 16.

The holder 21 holding the end part of the optical cable 11 that has been subjected to the terminal processing has a holder body 22.

The top surface of the holder body 22 has a sheath containing groove 23 for containing a part of the sheath 16 of the optical cable 11 and a core containing groove 24 for containing the optical fiber core 12 drawn from the end part of the optical cable 11.

The sheath containing groove 23 has a positioning surface 25 at a side of the core containing groove 24. The end surface 16a of the sheath 16 of the optical cable 11 contained in the sheath containing groove 23 reaches the positioning surface 25. A relief groove 26 is formed around the positioning surface 25.

A protective jacket containing groove 27 for containing the protective jacket 15 slightly exposed from the sheath 16 is formed between the sheath containing groove 23 and the core containing groove 24.

One side of the holder body 22 has a core holding lid 31, a middle holding lid 32, and a sheath holding lid 33.

The core holding lid 31 has a hinge part 34, which is provided in a holding groove 35 formed on the holder body 22. The middle holding lid 32 also has a hinge part 36, which is provided in a holding groove 37 formed on the holder body 22.

The holder body 22 has a connection pin 38 penetrating the holding grooves 35 and 37. The connection pin 38 penetrates non-illustrated penetration holes formed on the hinge parts 34 and 36. Accordingly, the core holding lid 31 and the middle holding lid 32 are rotatably connected to the holder body 22 based on the axis of the connection pin 38. The core holding lid 31 and the middle holding lid 32 are rotatably moved, whereby the top surface of the holder body 22 is open and closed. The core holding lid 31 is disposed such that the core holding lid 31 is rotatably moved toward the top surface of the holder body 22, whereby the core holding lid 31 covers the top parts of the core containing groove 24 and the protective jacket containing groove 27. The middle holding lid 32 is disposed such that the middle holding lid 32 is rotatably moved toward the top surface of the holder body 22, whereby the middle holding lid 32 covers the top part of the sheath containing groove 23 at one end side of the sheath containing groove 23.

The core holding lid 31 and the middle holding lid 32 have pushing plate parts 41 and 42 made of elastic materials such as rubber on the surfaces facing the holder body 22. The core holding lid 31 and the middle holding lid 32 are rotatably moved toward the top surface of the holder body 22, whereby the pushing plate part 41 is disposed on the top part of the core containing groove 24, and the pushing plate part 42 is disposed on the top part of the sheath containing groove 23.

The holder body 22 has a magnet 44 on the top surface of the opposite side to a side where the core holding lid 31 and the middle holding lid 32 are connected. When the core holding lid 31 and the middle holding lid 32 are disposed on the top surface of the holder body 22, the core holding lid 31 and the middle holding lid 32 are in contact with the magnet 44.

The core holding lid 31 and the middle holding lid 32 are formed of magnetic materials such as irons. Accordingly, in the state that the core holding lid 31 and the middle holding lid 32 are disposed on the top surface of the holder body 22, the core holding lid 31 and the middle holding lid 32 are adhered thereonto by the magnetic force of the magnet 44.

The sheath holding lid 33 has a hinge part 51, which is provided between a pair of supporting projection parts 52 formed on the holder body 22. The hinge part 51 of the sheath holding lid 33 has a non-illustrated penetration hole. A connection pin 53 is hung between the supporting projection parts 52 of the holder body 22. The connection pin 53 penetrates the penetration hole of the hinge part 51. Accordingly, the sheath holding lid 33 is rotatably connected to the holder body 22 based on the axis of the connection pin 53. The sheath holding lid 33 is rotatably moved, whereby the top surface of the holder body 22 is open and closed. The sheath holding lid 33 is disposed such that the sheath holding lid 33 is rotatably moved toward the top surface of the holder body 22, whereby the sheath holding lid 33 covers the top part of the sheath containing groove 23.

The sheath holding lid 33 has a cable pushing part 61. The cable pushing part 61 has a pushing member 63 pressed by a pressing spring 62 toward the holder body 22, and a pushing plate part 64 attached onto the surface of the pushing member 63. The pushing plate part 64 is formed of elastic materials such as rubber. The sheath holding lid 33 is rotatably moved toward the top surface of the holder body 22, whereby the pushing plate part 64 is disposed on the top part of the sheath containing groove 23.

The sheath holding lid 33 has an engaging plate 71 on the opposite side to a side connected to the holder body 22. The engaging plate 71 is disposed between a pair of support parts 72 formed on the sheath holding lid 33 and rotatably supported by a supporting pin 73. The engaging plate 71 has a claw part 74 on the front side in the direction of the rotatable movement toward the holder body 22. The claw part 74 is projected toward the side where the holder body 22 and the sheath holding lid 33 are connected. In the claw part 74, the surface of the front side in the direction of the rotatable movement toward the holder body 22 is formed of a tapered surface 74a.

A pressing spring 75 is provided between the engaging plate 71 and the sheath holding lid 33 in the rear side behind the support pin 73 in the direction of the rotatable movement toward the holder body 22. The engaging plate 71 is pressed by the pressing spring 75 in the direction of the rotatable movement toward the projection direction of the claw part 74.

The holder body 22 has an engaging claw 77, which can be engaged with the claw part 74 of the engaging plate 71. The engaging claw 77 has a tapered surface 77a downwardly inclined toward the projection direction.

The claw part 74 of the engaging plate 71 is engaged with the engaging claw 77, whereby the sheath holding lid 33 is locked in the state that the sheath holding lid 33 is closed to the holder body 22.

As described, the holder 21 having the above structure includes the core holding lid 31 and the middle holding lid 32, which are attached to the holder body 22 by the magnetic force of the magnet 44 to hold the optical fiber core 12 and the part of sheath 16 of the optical cable 11, and the sheath holding lid 33, which holds the part of the sheath 16 of the optical cable 11 through the stronger pressing force of the pressing spring 62 than that of the core holding lid 31 and the middle holding lid 33.

In order to hold the optical cable 11 in the holder 21 having the structure described above, the optical cable 11 is subjected to terminal processing. Specifically, the sheath 16 is removed to expose the optical fiber core 12 covered with the protective jacket 15. The protective jacket 15 is removed while leaving a slight part of the protective jacket 15 to expose the optical fiber core 12. A predetermined length of the sheath 14 of the optical fiber core 12 is removed to expose the glass fiber 13.

Next, the optical cable 11 that has been subjected to the terminal processing is contained in the holder body 22. Specifically, the part of the sheath 16 is contained in the sheath containing groove 23. The protective jacket 15 is contained in the protective jacket containing groove 27. The optical fiber core 12 is contained in the core containing groove 24. The optical cable 11 is moved in the direction of the end part thereof, so that the end surface 16a of the sheath 16 reaches the positioning surface 25. In this way, the optical cable 11 that has been subjected to the terminal processing is contained in the state that the optical cable 11 is positioned to the holder body 22.

Upon cutting, burrs or the like may be formed on the edge of the end surface 16a of the sheath 16. However, when the end surface 16a of the sheath 16 reaches the positioning surface 25, burrs formed on the end surface 16a come into the relief groove 26 around the positioning surface 25. Accordingly, the optical cable 11 can be contained in the holder body 22 without being affected from burrs formed on the end surface 16a of the sheath 16.

Once the optical cable 11 is contained in the holder body 22, each of the core holding lid 31, the middle holding lid 32, and the sheath holding lid 33 is rotatably moved to be closed.

In the state that the core holding lid 31 and the middle holding lid 32 are disposed on the top surface of the holder body 22, the core holding lid 31 and the middle holding lid 32 are adhered thereonto by the magnet 44. Accordingly, the optical fiber core 12 and the sheath 14 are pressed and held by the pressing plate 41 of the core holding lid 31. The part of the sheath 16 is pressed and held by the pressing plate 42 of the middle holding lid 32.

The sheath holding lid 33 is rotatably moved toward the holder body 22, whereby the tapered surface 74a of the claw part 74 of the engaging plate 71 contacts the tapered surface 77a of the engaging claw 77 of the holder body 22. In this state, the sheath holding lid 33 is rotatably moved, whereby the engaging plate 71 is rotatably moved against the pressing force of the pressing spring 75. The sheath holding lid 33 is further rotatably moved, whereby the claw part 74 of the engaging plate 71 is moved over the engaging claw 77 such that the engaging plate 71 is rotatably moved in a reverse direction due to the pressing force of the pressing spring 75. Accordingly, the claw part 74 is engaged with the engaging claw 77, so that the sheath holding lid 33 is locked to the holder body 22.

The pressing plate part 64 is pressed onto the part of the sheath 16 of the optical cable 11 due to the pressing member pressed toward the holder body 22 by the pressing spring 62. Accordingly, the part of the sheath 16 of the optical cable 11 is strongly held.

The holder 21 surely holds the part of the sheath 16 as well as the optical fiber core 12 of the optical cable 11.

Meanwhile, when separating the optical cable 11, each of the core holding lid 31, the middle holding lid 32, and the sheath holding lid 33 is rotatably moved in a reverse direction so that the top surface of the holder body 22 is opened thereby releasing the holding of the optical cable 11.

The core holding lid 31 and the middle holding lid 32 are rotatably moved in a reverse direction against the magnetic force of the magnet 44. The engaging plate 71 is rotatably moved against the pressing force of the pressing spring 75, so that the engaged state of the claw part 74 that has been engaged with the engaging claw 77 is released. Thereafter, the sheath holding lid 33 is rotatably moved in a reverse direction.

Next, a fusion splicer will be described.

Figure 6:
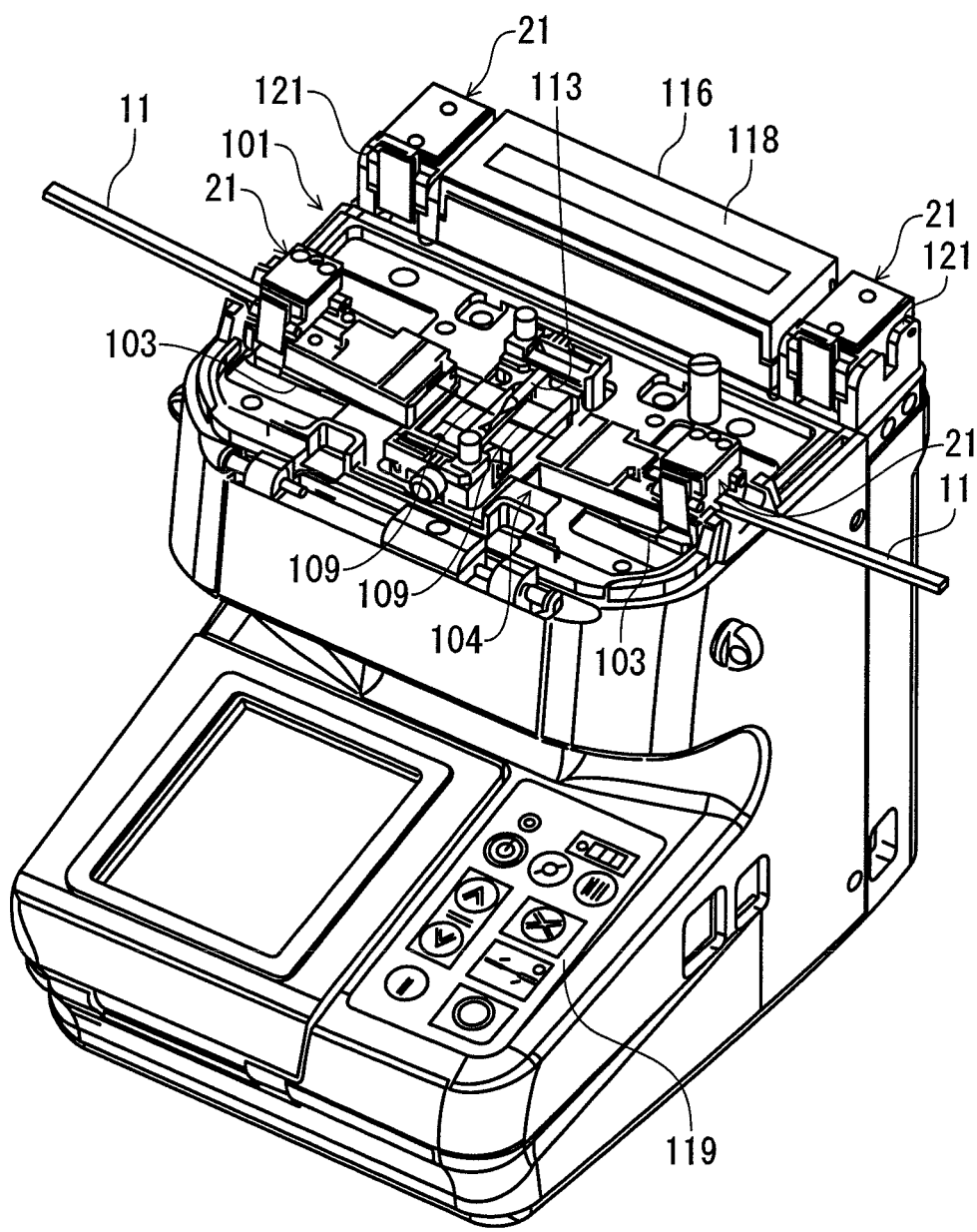
FIG. 6 is a perspective view of a fusion splicer for fusion splicing optical fiber cores to each other.

FIG. 6 is a perspective view of the fusion splicer when viewed in an obliquely upward direction.

For example, as illustrated in FIG. 6, a fusion splicer 101 relates to a machine used at an optical fiber equipment construction field to fusion splice the optical fiber cores 12 of the optical cables 11.

The fusion splicer 101 includes a fusion processing part 104 having a pair of holder mounting parts 103, onto which the holders 21 holding the end parts of the optical cables 11 are detachably attached. The holders 21 are mounted on the holder mounting parts 103, whereby the optical fiber cores 12 of the optical cables 11 held by the holders 21, respectively, are positioned at a fusion position. Meanwhile, the holders 21 having a symmetric structure are mounted on the holder mounting parts 103, respectively.

The fusion processing part 104 includes a pair of V groove members 109 for positioning front ends of the optical fiber cores 12 extending from the holders 21 mounted on the holder mounting parts 103, and an electrode 113 disposed between the pair of V groove members 109 for fusing end surfaces of the glass fibers 13 of the optical fiber cores 12 facing each other through electrical discharge.

The fusion processing part 104 splices the optical fiber cores 12 positioned at the fusion position through heat fusion of the glass fibers 13.

The V groove members 109 for positioning the optical fiber cores 12 have a dimension set to position the optical fiber cores 12 to be spliced to each other while supporting the optical fiber cores 12 in a straight line.

The holders 21 may be mounted in advance on the holder mounting parts 103. In that case, the holders 21 mounted on the holder mounting parts 103 hold the optical cables 11 that have been subjected to the terminal processing.

The fusion processing part 104 is open and closed by a non-illustrated opening and closing cover.

The fusion splicer 101 includes a heat contraction processing part 116 for heating and contracting an adhesive tube 134 and a protective tube 135, as described hereafter, which cover the periphery of a fusion splice part S (refer to FIG. 7) between the optical fiber cores 12, by using a heater. The heat contraction processing part 116 includes its exclusive opening and closing cover 118 and is provided adjacent to the fusion processing part 104.

The heat contraction processing part 116 also includes holder mounting parts 121, on which the holders 21 holding the end parts of the optical cables 11 are detachably mounted. The holders 21 are mounted on the holder mounting parts 121, whereby the fusion splice part S of the optical fiber cores 12 is positioned at the heat contraction processing part 116.

The heat contraction processing part 116 has a non-illustrated heater for heating and contracting the adhesive tube 134 and the protective tube 135. The heat contraction processing part 116 heats and contracts the centers of the adhesive tube 134 and the protective tube 135 at a high temperature. After that, in order to contract the end parts of the tubes, heating temperature distribution is provided to the heater. Accordingly, bubbles generated in the adhesive tube 134 and the protective tube 135 upon heating is easily discharged from their respective end parts.

The fusion splicer 101 includes an operation part 119 for operating the fusion processing part 104 and the heat contraction processing part 116.

Next, the case of fusion splicing the optical fiber cores 12 of the optical cables 11 will be described.

First, each of the optical cables 11 to be spliced to each other is subjected to terminal processing to expose the optical fiber cores 12 and the glass fibers 13.

Next, the terminal parts of the optical cables 11 are held on the holders 21 (refer to FIGS. 2 and 3). The adhesive tube 134 and the protective tube 135 penetrate one of the optical cables 11.

Once the optical cables 11 are held on the holders 21, the glass fibers 13 are cut by a cutter to have a predetermined length and form cross sections. The holders 21 are mounted on the holder mounting parts 102 of the fusion splicer 101, respectively (refer to FIG. 6).

According to this, the glass fibers 13 of the optical fiber cores 12 extending from the holders 21 are positioned by the V groove members 109 of the fusion processing part 104. The end parts of the glass fibers 13 are facing to each other at the fusion position by the electrode 113.

In this state, the operation part 119 of the fusion splicer 101 is operated for electrical discharge through the electrode 113, so that the end parts of the glass fibers 13 of the optical fiber cores 12 are fusion spliced to each other.

Once the optical fiber cores 12 are fusion spliced to each other, the core holding lid 31, the middle holding lid 32, and the sheath holding lid 33 of each of the holders 21 are opened to detach the optical cables 11.

Figure 7:
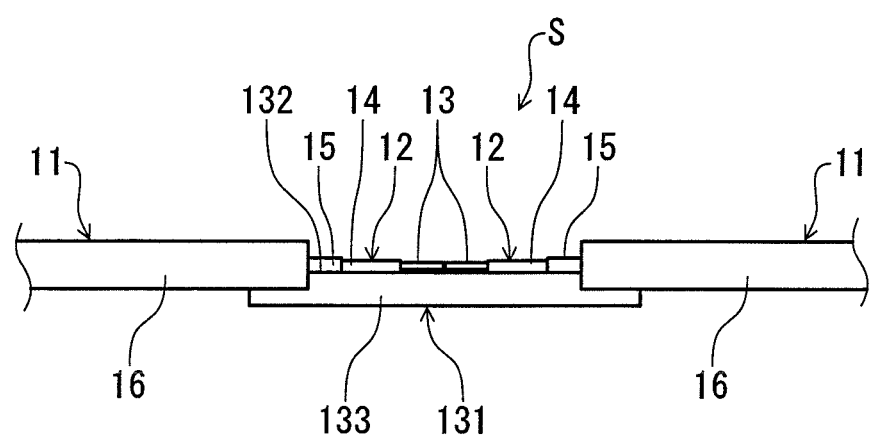
FIG. 7 is a cross-sectional view of a fusion splice part to explain a method for reinforcing the fusion splice part.

Next, as illustrated in FIG. 7, a reinforcing member 131 is provided along the fusion splice part (splice part) S of the optical cables 11.

Figure 8:
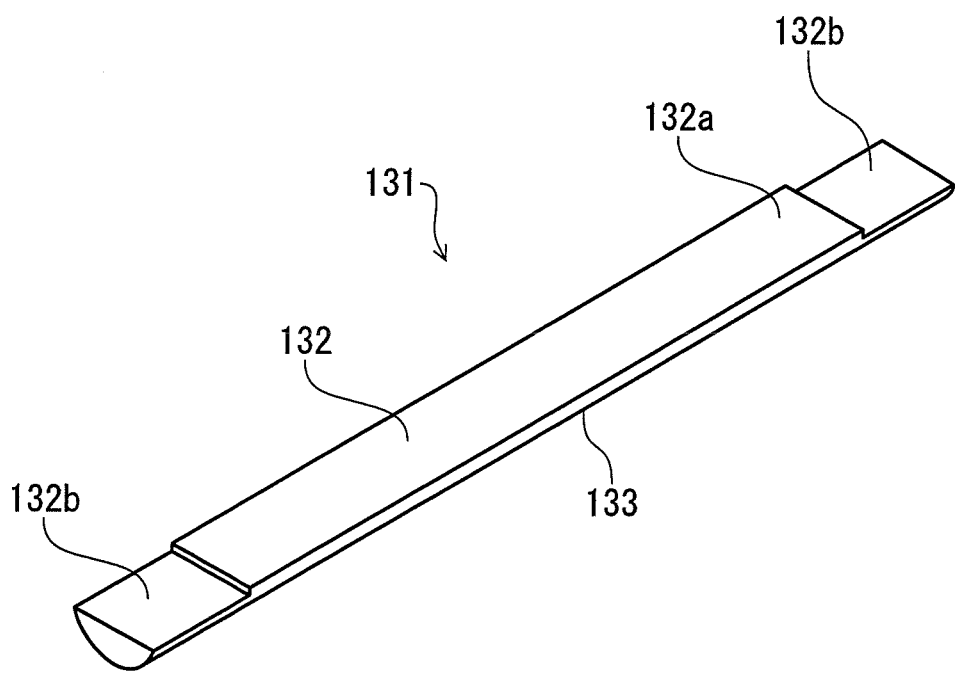
FIG. 8 is a perspective view of a reinforcing member provided along the fusion splice part.

For example, the reinforcing member 131 is made of metals such as stainless, glass or ceramics. As illustrated in FIG. 8, the reinforcing member 131 has a plane surface part 132, and a circular curved surface part 133 when viewed in an aspect of its cross section. Both end sides of the plane surface part 132 of the reinforcing member 131 recede toward the curved surface part 133, compared to the center part, so that both the end sides of the plane surface part 132 are lower than the center part. The center part is a core disposition area 132a where the optical fiber cores 12 are disposed. Both the receded end sides of the plane surface part 132 are sheath disposition areas 132b where the sheaths 16 of the optical cables 11 are disposed.

The optical fiber cores 12 including the fusion splice part S are disposed in the core disposition areas 132a of the plane surface part 132 of the reinforcing member 131. The sheaths 16 are disposed in the sheath disposition areas 132b.

Figure 9:
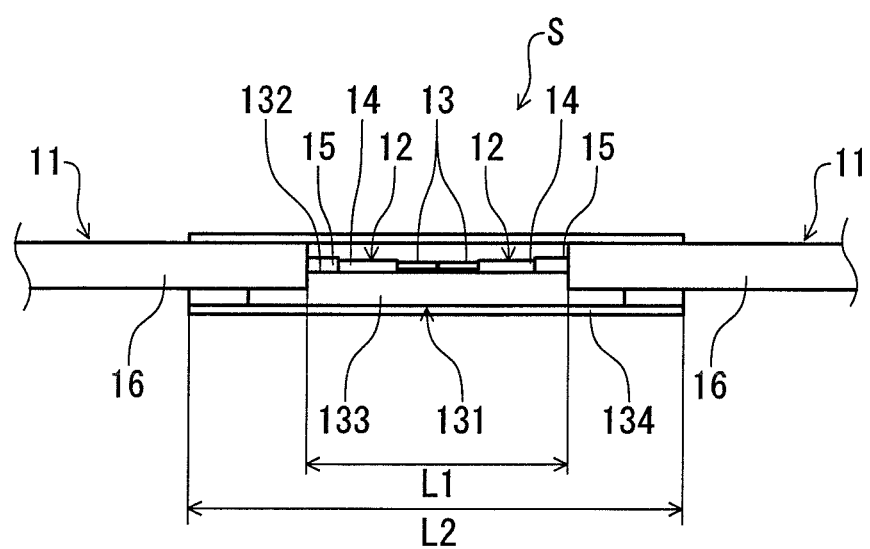
FIG. 9 is a cross-sectional view of the fusion splice part to explain the method for reinforcing the fusion splice part.

In this state, the adhesive tube (inner tube) 134 having adhesion and made of a heat contractive resin slides, so that as illustrated in FIG. 9, the adhesive tube 134 covers the fusion splice part S provided along the reinforcing member 131.

The adhesive tube 134 has a length dimension L2 longer than a length dimension L1 of the optical fiber cores 12 including the fusion splice part S. Accordingly, when the adhesive tube 134 covers the fusion splice part S provided along the reinforcing member 131, both the ends of the adhesive tube 134 are disposed over the parts of the sheaths 16 of the optical cables 11, respectively.

Once the adhesive tube 134 is mounted, the opening and closing cover 118 of the heat contraction processing part 116 is opened, so that the optical cables 11 are held on the holders 21 of the heat contraction processing part 116.

In this way, the fusion splice part S of the optical fiber cores 12 covered with the adhesive tube 134 is positioned at the thermal contraction processing part 116.

In this state, the operation part 119 of the fusion splicer 101 is operated to heat the heater. Then, the adhesive tube 134 is heat contracted by the heater starting from the center part thereof, so that the adhesive tube 134 is closed to the fusion splice part S provided along the reinforcing member 131. Accordingly, the reinforcing member 131 is provided along the fusion splice part S of the optical fiber cores 12 of the optical cables 11, and covered with the adhesion tube 34 closed to the fusion splice part S so that integration is accomplished.

Figure 10:
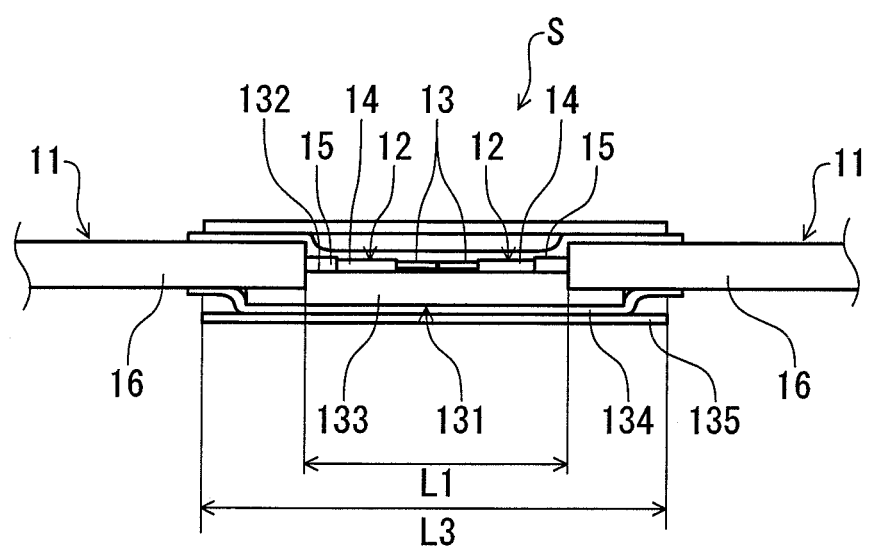
FIG. 10 is a cross-sectional view of the fusion splice part to explain the method for reinforcing the fusion splice part.

Next, as illustrated in FIG. 10, the optical cables 11 are detached from the holders 21, and the protective tube (outer tube) 135 made of a heat contractive resin slides, so that the fusion splice part S covered with the adhesive tube 134 is covered with the protective tube 135.

The protective tube 135 also has a length dimension L3 longer than a length dimension L1 of the optical fiber cores 12 including the fusion splice part S. Accordingly, when the protective tube 135 covers the fusion splice part S covered with the adhesive tube 134, both ends of the protective tube 135 are disposed over the sheaths 16 of the optical cables 11.

The length dimension L2 of the adhesive tube 134 is longer than the length dimension L3 of the protective tube 135. Accordingly, when the protective tube 135 covers the fusion splice part S covered with the adhesive tube 134, both ends of the adhesive tube 134 are projected from both the ends of the protective tube 135 outwardly in the length direction. The dimension of each of both the ends of the adhesive tube 134 projected from both the ends of the protective tube 135 is preferably about 0.5 to 1.0 mm.

Once the protective tube 135 is mounted, the optical cables 11 are held on the holders 21 of the heat contraction processing part 116.

In this way, the fusion splice part S of the optical fiber core 12 covered with the protective tube 135 is positioned at the heat contraction processing part 116.

Figure 11:
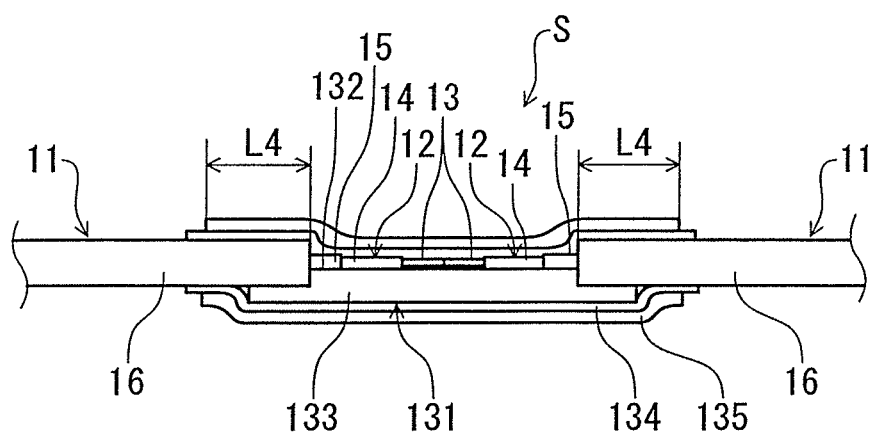
FIG. 11 is a cross-sectional view of the fusion splice part to explain the method for reinforcing the fusion splice part.

In this state, the operation part 119 of the fusion splicer 101 is operated to heat the heater. Then, the protective tube 135 is heat contracted by the heater starting from the center part thereof, so that the protective tube 135 is closed to the fusion splice part S covered with the adhesive tube 134. Accordingly, as illustrated in FIG. 11, the reinforcing member 131 is provided along the fusion splice part S of the optical fiber cores 12 of the optical cables 11, and reinforced by the adhesive tube 134 and the protective tube 135, which are closed to the fusion splice part S.

In the state that the adhesive tube 134 and the protective tube 135 are heat contracted and closed to the fusion splice part S, a length L4 of the adhesive tube 134 and the protective tube 135 covering the sheaths 16 in the length direction is at least 7 mm.

In other words, when the adhesive tube 134 and the protective tube 135 are heat contracted and closed to the fusion splice part S, the length dimensions L2 and L3 of the adhesive tube 134 and the protective tube 135 are predetermined to cover at least 7 mm of the sheaths 16 of the optical cables 11 in the length direction.

Figure 12:
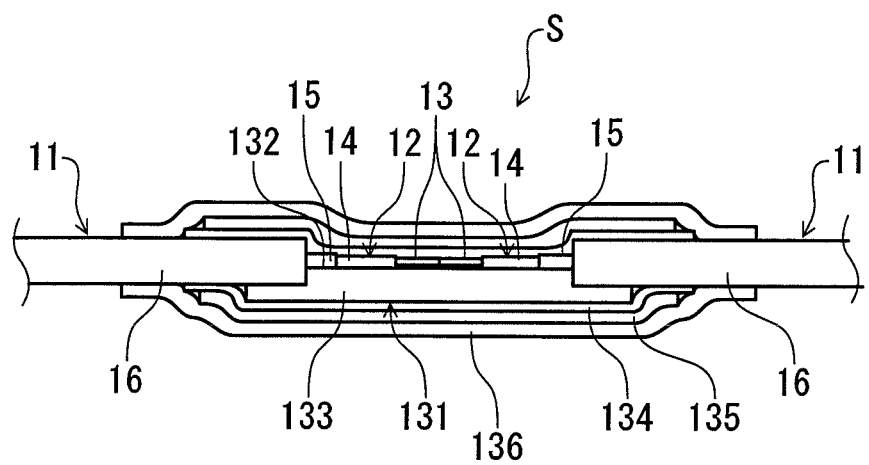
FIG. 12 is a cross-sectional view of the fusion splice part to explain the method for reinforcing the fusion splice part.

If the reinforced fusion splice part S is installed outside of a building, in order to protect the fusion splice part S, the fusion splice part S is covered with a weather resistance tube 136, which is made to be heat contracted, as illustrated in FIG. 12. For the weather resistance tube 136, for example, a tube made of an electron beam cross-linked soft polyolefin resin is suitable. The fusion splice part S can be more safely protected by the weather resistance tube 136.

Especially, if the adhesive tube 134 and the protective tube 135 are made of a transparent resin to enable the fusion splice part S to be seen, influence of the UV rays can be suppressed.

In order to protect the fusion splice part S, the fusion splice part S may be wrapped with a tape made of an electron beam cross-linked soft polyolefin resin to be heat contracted, instead of the weather resistance tube 136.

The fusion splice part S may be covered with a cylinder made of metal. In that case, the fusion splice part S can be more strongly reinforced.

As described in the above, according to the method for reinforcing a splice part and the reinforcing structure of the present embodiment, the reinforcing member 131 is provided along the fusion splice part S of the optical fiber cores 12, and the periphery of the reinforcing member 131 is covered with the adhesive tube 134 and the protective tube 135, so that the fusion splice part S can be surely reinforced.

Especially, the reinforcing member 13 is provided such that both ends of the reinforcing member overlap with the sheaths 16 of the optical cables 11. The adhesive tube 134 and the protective tube 135 cover the reinforcing member 131 such that both ends of each of the tubes overlap with the sheaths 16 of the optical cables 11, and are contracted. Accordingly, the reinforced part of the optical fiber cores 12 including the fusion splice part S and the sheaths 16 of both sides thereof are integrated thereby enhancing the reinforcement. As a result, sufficient strength against the tensile force is assured.

The adhesive tube 134 is projected outwardly in the length direction of the protective tube 135, whereby the adhesion force of both the ends of the adhesive tube 134 to the sheaths 16 increase. As a result, the reinforcement strength increases.

Especially, since the length of the parts of the adhesive tube 134 and the protective tube 135 overlapping with the sheaths 16 in the length direction is at least 7 mm, sufficient adhesion force of the adhesive tube 134 and the protective tube 135 to the sheaths 16 can be assured.

In the reinforcing member 131, the height of the sheath disposition areas 132b where the sheaths 16 are disposed is lower than the core disposition area 132a where the optical fiber cores 12 are disposed. Accordingly, a step difference caused from different contour of the sheathe 16 and the optical fiber core 12 near the end surface 16a of the sheath 16 due to the thickness of the sheath 16 can be removed. As a result, transformation of the optical fiber cores 12 due to the step difference can be suppressed.

The present embodiment has described cross-section rectangular optical drop cables as an example of the optical cables 11 to be spliced each other. However, the applicable optical cables 11 are not limited to optical drop cables. For example, the present invention may be applied to the case of splicing the optical fiber cores 12 of the optical cables 11 formed of cross-section circular optical fiber codes.

Figure 13:
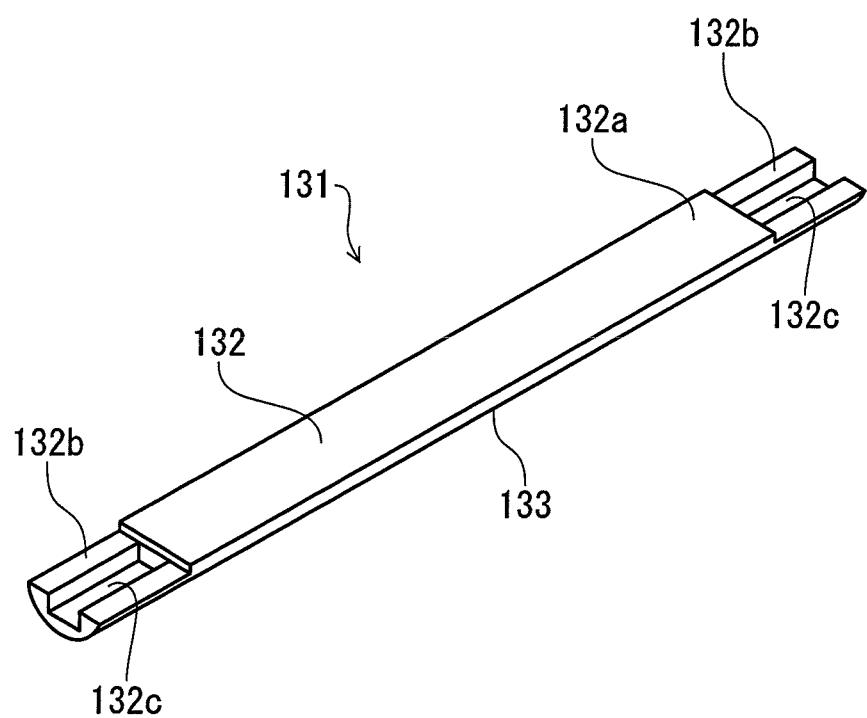
FIG. 13 is a perspective view of a reinforcing member applied to an optical drop cable.

For the reinforcing member 131 used for the optical cables 11 formed of cross-section rectangular optical drop cables, as illustrated in FIG. 13, cross-section shaped groove parts 132c corresponding to the contour of the sheaths 16 of the optical cables 11 formed of optical drop cables are preferably formed at the sheath disposition areas 132b.

The groove parts 132c for containing the sheaths 16 are formed at the sheath disposition areas 132b of the reinforcing member 131 where the sheaths 16 are disposed, and the sheaths 16 are disposed in the groove parts 132c, whereby the mounting ability of the reinforcing member 131 on the sheaths 16 increases. As a result, the integration can be more easily accomplished.

Since the groove parts 132c are formed, positioning the reinforcing member 131 to the fusion splice part S is facilitated, thereby increasing work efficiency.

In the fusion splicer 101, the holders 21 are detachable. However, the holders 21 may be fixed to the fusion splicer 101.

The fusion splicer 101 has the heat contraction processing part 116 having one heater. The adhesive tube 134 and the protective tube 135 are heat contracted by the heat contraction processing part 116. However, the heat contraction processing part 116 may have two heaters, so that the adhesive tube 134 and the protective tube 135 may be heat contracted by the heaters, respectively.

While the present invention has been described in detail or by reference to particular embodiments, it is apparent to one skilled in the art that various modifications and changes can be added without departing from the spirit and the scope of the present invention. The present application is based on the Japanese patent application (Japanese Patent Application No. 2009-058617) filed on Mar. 11, 2009, the disclosures of which are herein incorporated by reference.

DESCRIPTION OF REFERENCE NUMERALS

11: optical cable, 12: optical fiber core, 16: sheath, 131: reinforcing member, 132a: core disposition area, 132b: sheath disposition area, 132c: groove part, 134: adhesive tube (inner tube), 135: protective tube (outer tube), 136: weather resistance tube, S: fusion splice part (splice part)

The invention claimed is:

1. A method for reinforcing a splice part where optical fiber cores extending from sheaths of a pair of optical cables are spliced to each other, the method comprising:

providing a reinforcing member along the splice part so that both ends of the reinforcing member overlap with each of the sheaths of the optical cables in the axial direction, the ends of the reinforcing member supporting respective sheaths by direct contact with the sheaths;

covering a periphery of the splice part provided with the reinforcing member by an inner tube so that the reinforcing member is disposed on an inside of the inner tube in the radial direction, and contracting the inner tube so that both ends of the contracted inner tube overlap with the reinforcing member such that the ends of the contracted inner tube extend beyond respective ends of the reinforcing member in the axial direction;

covering a periphery of the inner tube by an outer tube, and contracting the outer tube so that both ends of the contracted outer tube overlap with the reinforcing member such that the ends of the contracted outer tube extend beyond respective ends of the reinforcing member in the axial direction, and so that the ends of the contracted inner tube extend beyond respective ends of the contracted outer tube in the axial direction; and directly adhering parts of the inner tube which extend beyond the ends of the outer tube in the axial direction to the sheaths.

2. The method for reinforcing a splice part according to claim 1, wherein lengths of parts of the inner tube and the outer tube overlap with the sheaths in the axial direction by at least 7 mm.

3. The method for reinforcing a splice part according to claim 1, wherein, in the reinforcing member, a sheath disposition area where the sheath is disposed is radially outward from a core disposition area where the optical fiber core part is disposed.

4. The method for reinforcing a splice part according to claim 1, further comprising forming a groove part for containing the sheaths in a sheath disposition area where the sheath is disposed, in the reinforcing member.

5. The method for reinforcing a splice part according to claim 4, wherein the groove part of the reinforcing member is in a cross-section shape corresponding to a contour of the sheaths of the optical cables.

6. The method for reinforcing a splice part according to claim 1, further comprising covering a periphery of the outer tube of the splice part with a weather resistance tube.

7. A structure for reinforcing a splice part where optical fiber cores extend from sheaths of a pair of optical cables, the structure comprising:

a reinforcing member provided along the splice part so that both ends of the reinforcing member overlap with each of the sheaths of the optical cables in the axial direction, the ends of the reinforcing member supporting respective sheaths by direct contact with the sheaths;

an inner tube covering a periphery of the splice part provided with the reinforcing member so that the reinforcing member is disposed on an inside of the inner tube in the radial direction, the inner tube being contracted so that both ends of the contracted inner tube overlap with the reinforcing member such that the ends of the contracted inner tube extend beyond respective ends of the reinforcing member in the axial direction; and an outer tube covering a periphery of the inner tube, and being contracted so that both ends of the contracted outer tube overlap with the reinforcing member such that the ends of the contracted outer tube extend beyond respective ends of the reinforcing member in the axial direction, and so that the ends of the contracted inner tube extend beyond respective ends of the contracted outer tube in the axial direction, wherein parts of the inner tube which extend beyond the ends of the outer tube in the axial direction are directly adhered to the sheaths.

8. The structure for reinforcing a splice part according to claim 7, wherein lengths of parts of the inner tube and the outer tube overlap with the sheaths in the axial direction by at least 7 mm.

9. The structure for reinforcing a splice part according to claim 7, wherein a sheath disposition area where the sheath is disposed is radially outward from a core disposition area where the optical fiber core part is disposed.

10. The structure for reinforcing a splice part according to claim 7, wherein a groove part for containing the sheaths is formed in a sheath disposition area where the sheath is disposed, in the reinforcing member.

11. The structure for reinforcing a splice part according to claim 10, wherein the groove part of the reinforcing member is in a cross-section shape corresponding to a contour of the sheaths of the optical cables.

12. The structure for reinforcing a splice part according to claim 7, wherein a periphery of the outer tube of the splice part is covered with a weather resistance tube.

* * * * *